United States Patent
Kasano et al.

(10) Patent No.: US 10,563,835 B2
(45) Date of Patent: Feb. 18, 2020

(54) VEHICLE HEADLAMP AND VEHICLE USING SAME

(71) Applicant: Panasonic Intellectual Property Management Co., Ltd., Osaka (JP)

(72) Inventors: Masahiro Kasano, Osaka (JP); Takashi Matsuda, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/096,285

(22) PCT Filed: Feb. 2, 2017

(86) PCT No.: PCT/JP2017/003775
§ 371 (c)(1),
(2) Date: Oct. 25, 2018

(87) PCT Pub. No.: WO2017/203749
PCT Pub. Date: Nov. 30, 2017

(65) Prior Publication Data
US 2019/0137066 A1    May 9, 2019

(30) Foreign Application Priority Data

May 26, 2016   (JP) ................................ 2016-104741

(51) Int. Cl.
*F21S 41/25*   (2018.01)
*F21S 41/143*   (2018.01)
*F21S 41/151*   (2018.01)
(Continued)

(52) U.S. Cl.
CPC ............ *F21S 41/25* (2018.01); *B60Q 1/0011* (2013.01); *B60Q 1/04* (2013.01); *F21S 41/141* (2018.01);
(Continued)

(58) Field of Classification Search
CPC ........ F21S 41/25; F21S 41/151; F21S 41/663; F21S 41/322; F21S 41/285; F21S 41/143;
(Continued)

(56) References Cited

U.S. PATENT DOCUMENTS

| 5,499,166 A | 3/1996 | Kato et al. | |
| 2003/0147252 A1* | 8/2003 | Fioravanti | B60Q 1/04 362/543 |

(Continued)

FOREIGN PATENT DOCUMENTS

| DE | 103 08 704 | 11/2004 |
| JP | 6-068702 | 3/1994 |

(Continued)

OTHER PUBLICATIONS

International Search Report of PCT application No. PCT/JP2017/003775 dated Apr. 25, 2017.
(Continued)

*Primary Examiner* — David V Bruce
(74) *Attorney, Agent, or Firm* — Wenderoth, Lind & Ponack, L.L.P.

(57) ABSTRACT

A vehicle headlamp includes a plurality of light emitting elements; a plurality of first lenses; and a plurality of second lenses. The first lens includes a first lens entrance and a first lens exit, and is configured to converge light entered the first lens entrance from the light emitting element on the first lens exit. The second lens includes a second lens entrance facing the first lens exit of the first lens and the second lens exit having a projection shape for forming a focal point. The focal point of the second lens is positioned at a side of the second lens ahead the first lens exit of the first lens.

8 Claims, 18 Drawing Sheets

(51) Int. Cl.
　　　*F21S 41/663*　　(2018.01)
　　　*F21S 41/32*　　(2018.01)
　　　*F21S 41/20*　　(2018.01)
　　　*F21S 41/141*　　(2018.01)
　　　*F21S 41/65*　　(2018.01)
　　　*B60Q 1/00*　　(2006.01)
　　　*B60Q 1/04*　　(2006.01)
(52) U.S. Cl.
　　　CPC ........... *F21S 41/143* (2018.01); *F21S 41/151* (2018.01); *F21S 41/285* (2018.01); *F21S 41/32* (2018.01); *F21S 41/322* (2018.01); *F21S 41/65* (2018.01); *F21S 41/663* (2018.01)
(58) Field of Classification Search
　　　CPC .......... F21S 41/141; F21S 41/32; F21S 41/65; B60Q 1/04; B60Q 1/0011
　　　See application file for complete search history.

(56) References Cited

U.S. PATENT DOCUMENTS

| | | | |
|---|---|---|---|
| 2004/0042212 A1 | 3/2004 | Du et al. | |
| 2008/0285297 A1* | 11/2008 | Ishida | F21S 41/143 362/539 |
| 2013/0135885 A1 | 5/2013 | Anzai | |
| 2014/0321137 A1 | 10/2014 | Chen | |
| 2015/0226395 A1 | 8/2015 | Taudt et al. | |
| 2016/0341386 A1* | 11/2016 | Iha | F21S 41/19 |
| 2017/0122528 A1 | 5/2017 | Kadoriku | |

FOREIGN PATENT DOCUMENTS

| | | |
|---|---|---|
| JP | 2003-260975 | 9/2003 |
| JP | 2005-537665 | 12/2005 |
| JP | 2013-110068 | 6/2013 |
| JP | 2014-014314 | 1/2014 |
| JP | 2015-526868 | 9/2015 |
| WO | 2015/107678 | 7/2015 |
| WO | 2015/198527 | 12/2015 |

OTHER PUBLICATIONS

Extended European Search Report dated Jun. 6, 2019 in European Application No. 17802351.1.

* cited by examiner

VEHICLE HEADLAMP AND VEHICLE USING SAME

CROSS-REFERENCE TO RELATED APPLICATIONS

This application is a U.S. national stage application of the PCT International Application No. PCT/JP2017/003775 filed on Feb. 2, 2017, which claims the benefit of foreign priority of Japanese patent application 2016-104741 filed on May 26, 2016, the contents all of which are incorporated herein by reference.

TECHNICAL FIELD

The present disclosure relates to a vehicle headlamp and a vehicle using the same.

BACKGROUND ART

A vehicle headlamp (also referred to as a headlamp or a headlight) generally includes a high beam (running headlamp) and a low beam (passing headlamp) (for example, PTL 1). The high beam can irradiate a wide range of a front of a vehicle, but give dazzle to a driver of an oncoming vehicle. The low beam does not give dazzle to the driver of the oncoming vehicle, but there is a problem that the low beam cannot irradiate a wide range of the front of the vehicle.

In recent years, a system, in which a presence or position of the oncoming vehicle or a preceding vehicle is detected by a camera placed on a vehicle, and the light of the vehicle headlamp giving dazzle to the driver of the vehicle is shielded, has been developed. Such a system is generally referred to as an adaptive driving beam (ADB) system.

For example, as illustrated in FIG. 13, high beam SW of the vehicle headlamp of the related art using the ADB system includes a plurality of LED light source modules M1 to M4 as light emitting elements and a plurality of lenses S1 to S4 for emitting the lights generated from LED light source modules M1 to M4 in a desired direction. Focal points of lenses S1 to S4 are generally positioned on light emitting surfaces of LED light source modules M1 to M4. Therefore, the lights generated from LED light source modules M1 to M4 become parallel lights through lenses S1 to S4. In addition, LED light source modules M1 to M4 of high beam SW are automatically switched on and off respectively when the camera detects the presence of the oncoming vehicle or the preceding vehicle. In this way, an irradiation range of high beam SW of the vehicle headlamp is controlled.

In a case where the lights emitted from lenses S1 to S4 are the parallel lights, light and dark between the irradiation range and a portion that is not in the irradiation range is clearly distinguished. Here, a positional deviation of light distribution characteristics of lenses S1 to S4 occurs due to vibration or temperature changes of lenses S1 to S4, assembly errors of the vehicle headlamp, or the like. The light distribution characteristics of the lens indicate a relationship between a direction of the light emitted from the lens and a luminous intensity distribution in the direction. Light distribution unevenness occurs due to the positional deviation of the light distribution characteristics.

CITATION LIST

Patent Literature

PTL 1: Japanese Patent Unexamined Publication No. 2005-537665

SUMMARY

An object of the present disclosure is to realize a vehicle headlamp capable of suppressing light distribution unevenness even if positional deviation of light distribution characteristics of a lens occurs.

In order to solve the problem described above, according to the disclosure, there is provided a vehicle headlamp including: a plurality of light emitting elements; a plurality of first lenses; and a plurality of second lenses. Each of the plurality of first lenses is provided corresponding to each of the plurality of light emitting elements, includes a first lens entrance and a first lens exit, and is configured to converge lights entered the first lens entrance from the each of the plurality of light emitting elements on the first lens exit. Each of the plurality of second lenses is provided corresponding to each of the plurality of light emitting elements, and includes a second lens entrance facing the first lens exit and a second lens exit having a projection shape for forming a focal point. The focal point of the second lens is positioned at a side of the second lens ahead the first lens exit of the first lens.

In the vehicle headlamp according to the disclosure, the focal point of the second lens is positioned on an inside of the second lens, so that the focal point of the second lens is positioned on a front side of a vehicle from the first lens exit of the first lens. Therefore, the light entering the second lens entrance of the second lens is not a parallel light but is emitted from the second lens in a state of being inclined toward a center of the vehicle. Therefore, light and dark between an irradiation range and a non-irradiation range of the light becomes blurred. Therefore, even if positional deviation of the light distribution characteristics occurs, light distribution unevenness can be suppressed.

DESCRIPTION OF EMBODIMENTS (Embodiment 1)

Hereinafter, a vehicle headlamp according to Embodiment 1 will be described with reference to FIGS. 1 to 9B.

<Configuration of Vehicle and Vehicle Headlamp>

Figure 1:
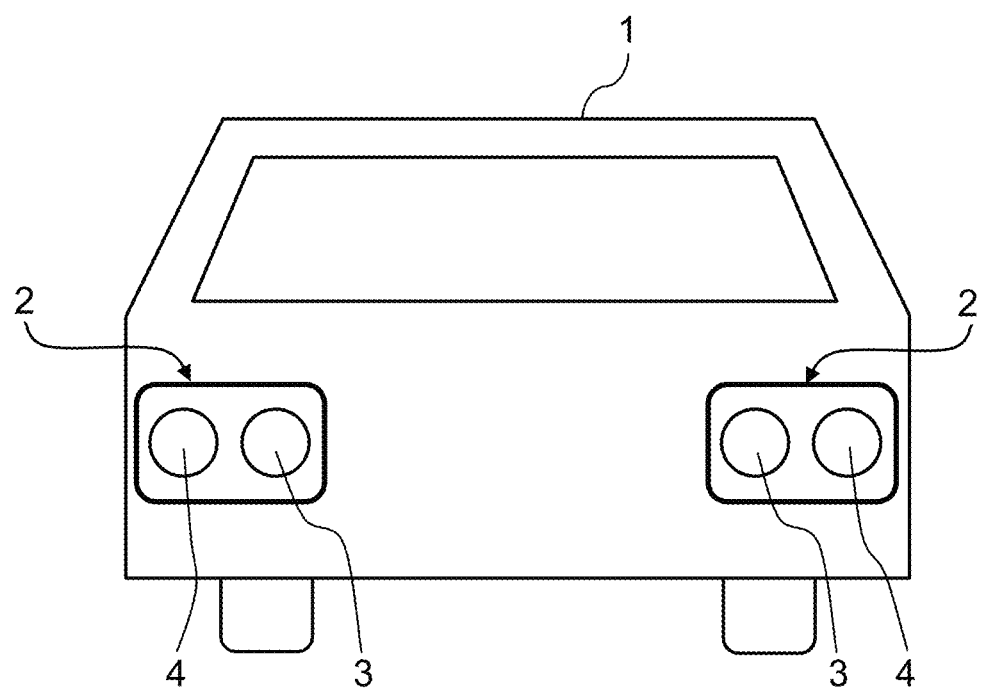
FIG. 1 is a front view of a vehicle including a vehicle headlamp according to Embodiment 1.

FIG. 1 is a front view of vehicle 1 including vehicle headlamp 2 according to Embodiment 1. In other words, FIG. 1 is a view of vehicle 1 as viewed from a front thereof. Moreover, hereinafter, unless otherwise noted, a forward direction of vehicle 1 is referred to as a front side, a backward direction is referred to as a back side, and when vehicle 1 is directed in the forward direction, a right direction is referred to as a right side and a left direction is referred to as a left side. In addition, a surface on the front side of vehicle 1 is referred to as a front surface.

Vehicle headlamps 2 are attached to right and left sides in the front surface of vehicle 1 one by one symmetrically in positions lower than a viewpoint of the driver. Vehicle headlamp 2 is configured of high beam 3 (running headlamp) and low beam 4 (passing headlamp).

<Configuration of High Beam>

Figure 2A:
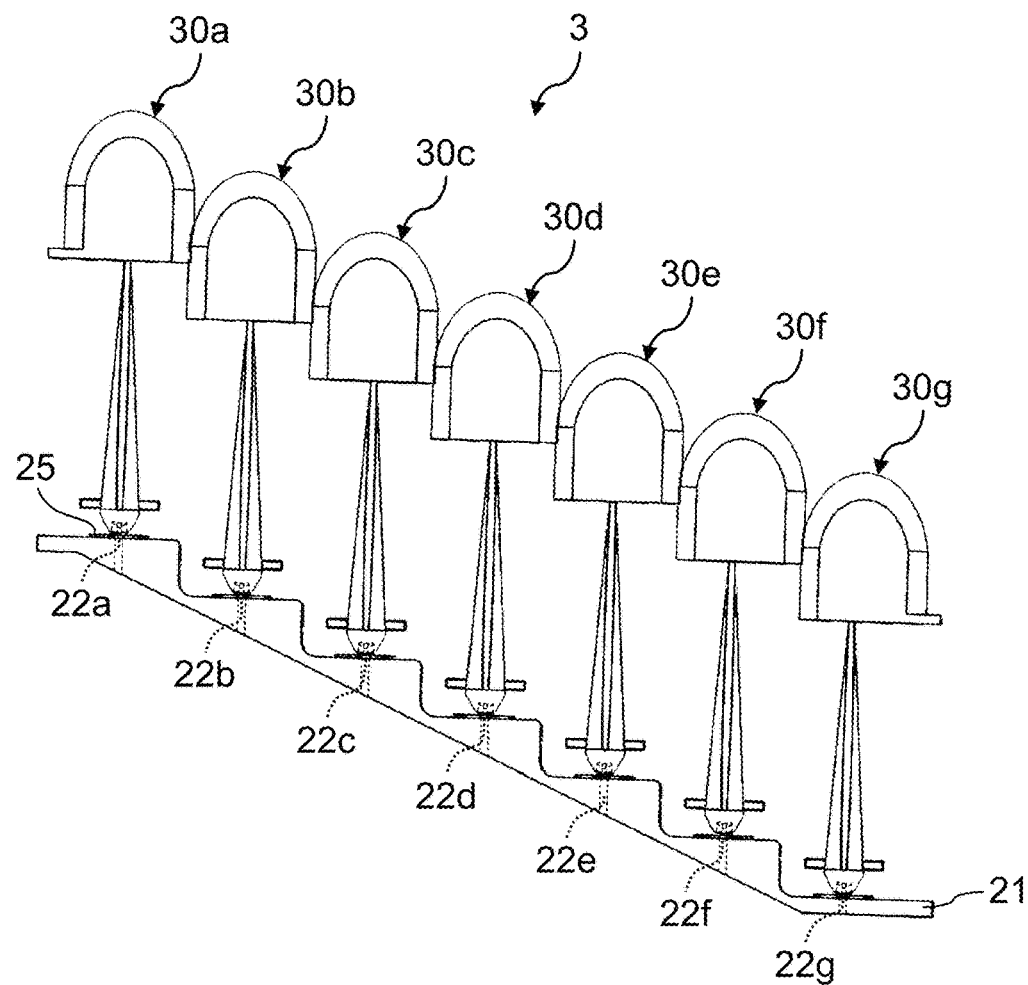
FIG. 2A is a plan view of a high beam of the vehicle headlamp according to Embodiment 1.
Figure 2B:
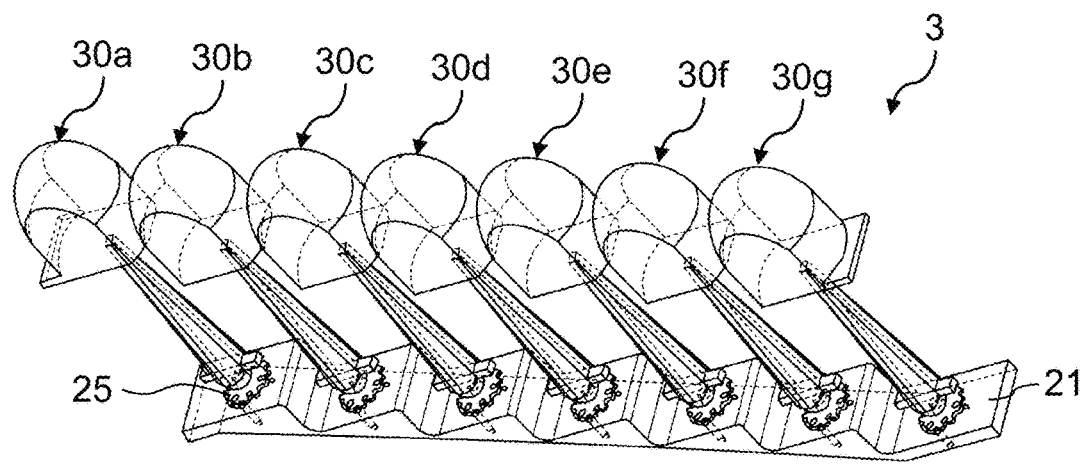
FIG. 2B is a perspective view of the high beam of the vehicle headlamp according to Embodiment 1.

FIG. 2A is a plan view of high beam 3 of vehicle headlamp 2 of the right side (left side of the page of FIG. 1) of vehicle 1 according to Embodiment 1. In FIG. 2A, an upper side of the page is the front side of vehicle 1 and a lower side of the page is the back side of the vehicle. FIG. 2B is a perspective view of high beam 3 of vehicle headlamp 2 according to Embodiment 1. In other words, FIG. 2B is a view of high beam 3 as viewed from a direction different from FIG. 2A. High beam 3 includes a plurality of light emitting diodes (LEDs) 22a to 22g which are light emitting elements, a plurality of LED boards 25 on which LEDs 22a to 22g are mounted, board 21 which holds the plurality of LED boards 25, and a plurality of lens units 30a to 30g which are disposed on LED boards 25. One lens unit 30 is provided on one LED 22. Here, reference numeral 30 indicates one of the plurality of lens units 30a to 30g and reference numeral 22 indicates one of the plurality of LEDs 22a to 22g.

Figure 3A:
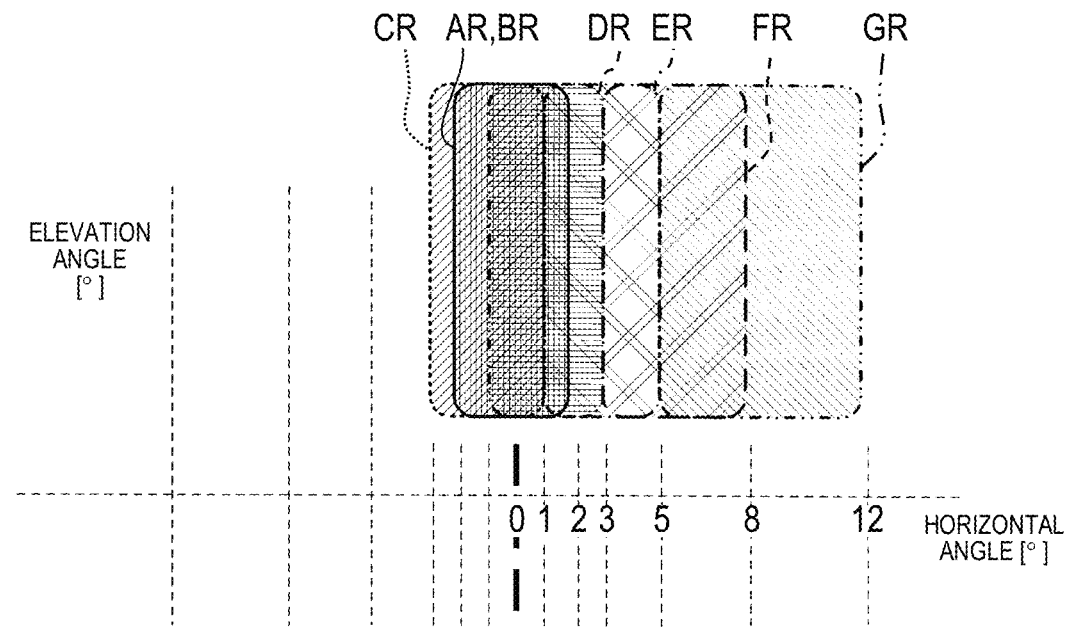
FIG. 3A is a schematic view of an irradiation range of light when a right high beam of the vehicle headlamp according to Embodiment 1 is fully lit.

FIG. 3A is a schematic view of an irradiation range of light when right high beam 3 of vehicle headlamp 2 according to Embodiment 1 is fully lit. Symbols AR to GR of FIG. 3A indicate the irradiation ranges of the light generated from respective LEDs 22a to 22g of high beam 3 of right vehicle headlamp 2 of vehicle 1. A horizontal axis indicates an angle (hereinafter, referred to as a horizontal angle) inclined in a horizontal direction from a center of vehicle 1 when the center is 0°. A vertical axis indicates an angle (hereinafter, referred to as an elevation angle) inclined in a height direction from a horizontal plane passing through high beam 3 when the horizontal plane is 0°. Moreover, a center point of the angle is a center of a front end of vehicle 1 for both the elevation angle and the horizontal angle.

The arrangement (position) of LEDs 22a to 22g and the position of the irradiation range of the light are irrelevant and the irradiation ranges of respective LEDs 22a to 22g are adjusted by lens units 30a to 30g. For example, as illustrated in FIG. 3A, irradiation ranges AR and BR of LEDs 22a and 22b are the horizontal angle 0±2°, irradiation range CR of LED 22c is the horizontal angle −1±2°, irradiation range DR of LED 22*d* is the horizontal angle 1±2°, irradiation range ER of LED 22*e* is the horizontal angle 3±2°, irradiation range FR of LED 22*f* is the horizontal angle 3 to 8°, and irradiation range GR of LED 22*g* is the horizontal angle 5 to 12°.

Figure 3B:
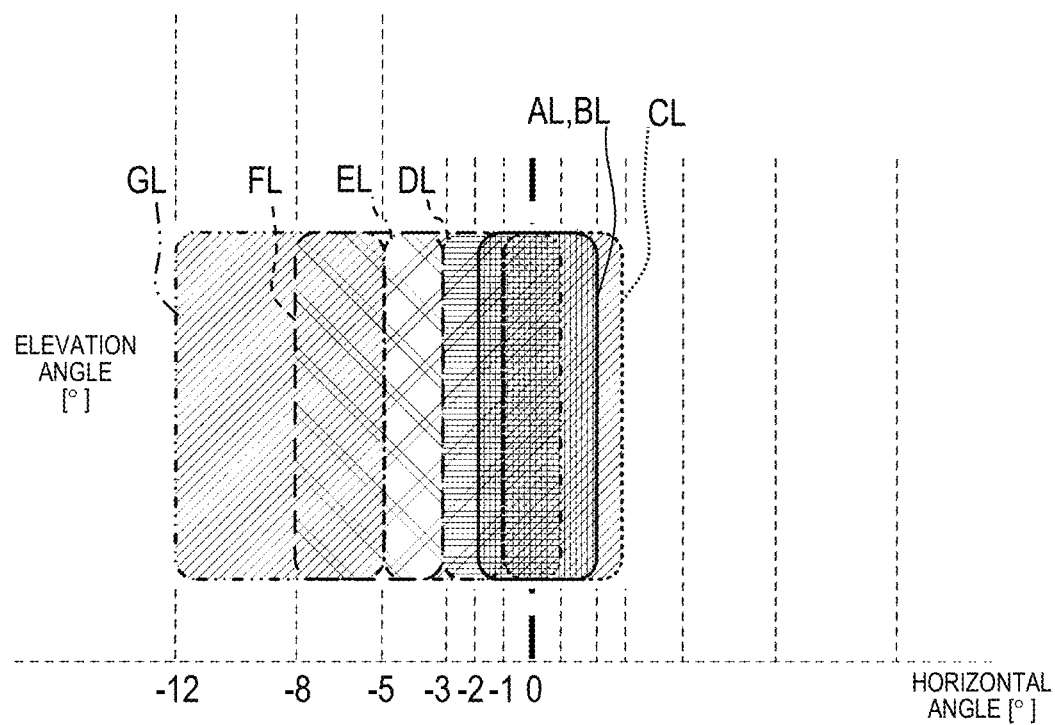
FIG. 3B is a schematic view of an irradiation range of the light when a left high beam of the vehicle headlamp according to Embodiment 1 is fully lit.
Figure 3C:
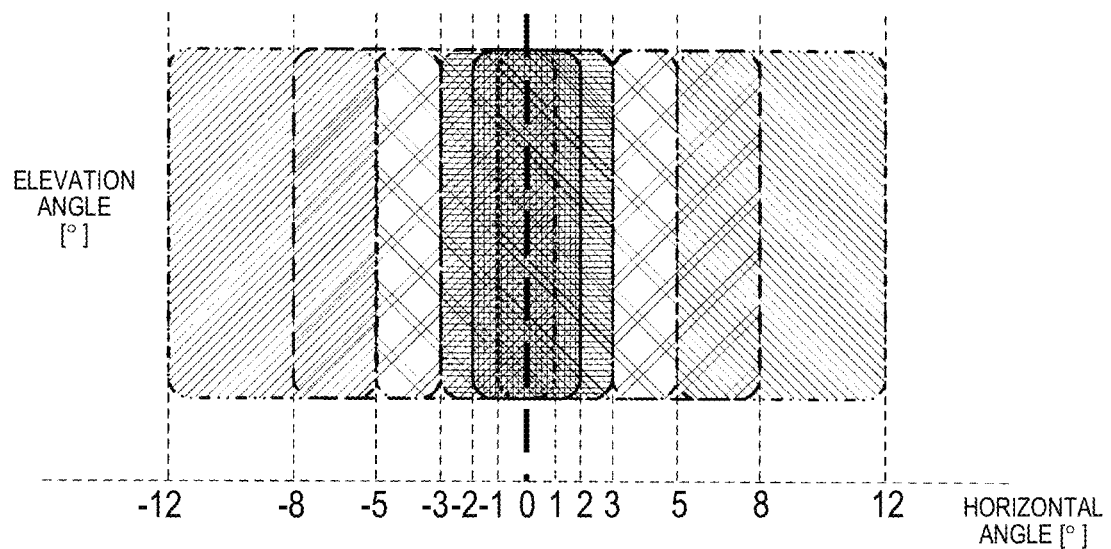
FIG. 3C is a schematic view of an irradiation range of the light when both right and left high beams of the vehicle headlamps according to Embodiment 1 are fully lit.
Figure 4:
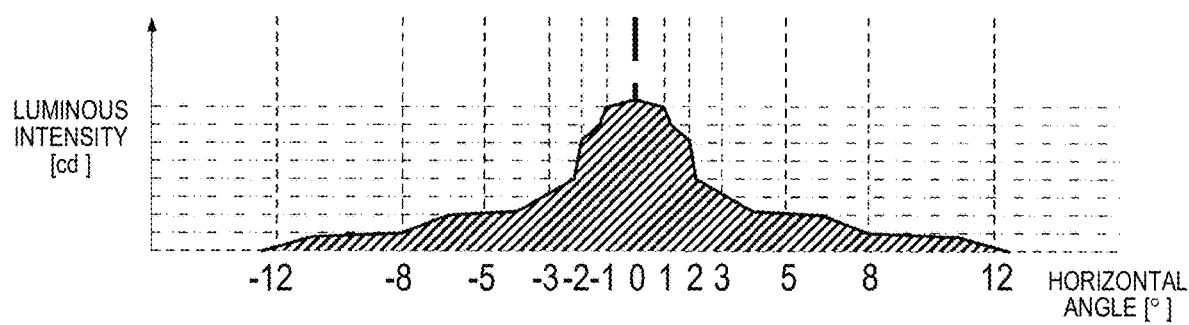
FIG. 4 is a view illustrating light distribution characteristics when the both right and left high beams of the vehicle headlamps according to Embodiment 1 are fully lit.

FIG. 3B is a schematic view of an irradiation range of the light when left high beam 3 of vehicle headlamp 2 according to Embodiment 1 is fully lit. Symbols AL to GL of FIG. 3B indicate the irradiation ranges of the light generated from LEDs of high beam 3 of left vehicle headlamp 2 of vehicle 1, and the irradiation ranges are bilaterally symmetrical with the irradiation ranges of right high beam 3 illustrated in FIG. 3A with the center (horizontal angle 0°) of vehicle 1 as an axis. FIG. 3C is a schematic view of an irradiation range of the light when both right and left high beams 3 of vehicle headlamps 2 according to Embodiment 1 are fully lit. In other words, FIG. 3C illustrates the irradiation range of combined light of right high beam 3 and left high beam 3. FIG. 4 is a view illustrating light distribution characteristics when the both right and left high beams 3 of vehicle headlamps 2 according to Embodiment 1 are fully lit. In other words, FIG. 4 illustrates luminous intensity distribution with respect to the irradiation range (horizontal angle), that is, the light distribution characteristics of lens units 30*a* to 30*g* in the horizontal direction when both right and left high beams 3 are fully lit.

In an Adaptive Driving Beam (ADB) system, when a camera placed on the vehicle detects an oncoming vehicle or a preceding vehicle, ON and OFF of each of LEDs 22*a* to 22*g* is automatically controlled and the irradiation range of the light is controlled, so that it is possible not to give dazzle to a driver.

<Configuration of Lens Unit>

Figure 5A:
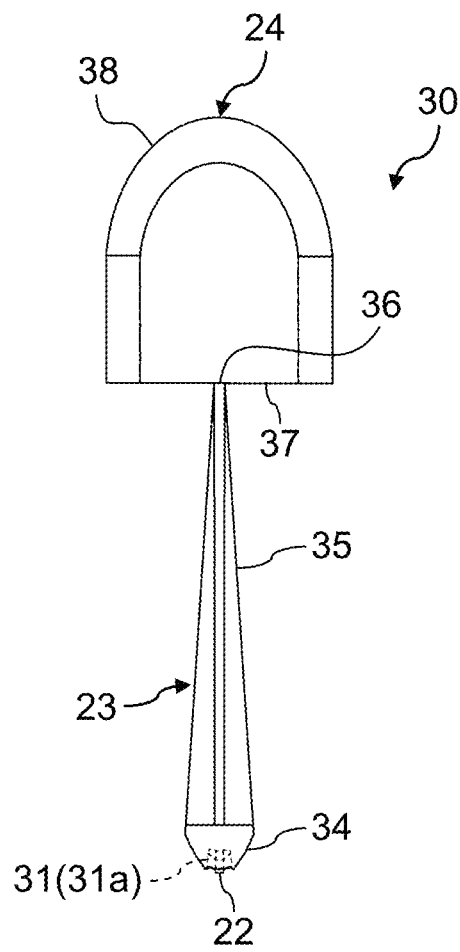
FIG. 5A is a plan view of a lens unit of the vehicle headlamp according to Embodiment 1.
Figure 5B:
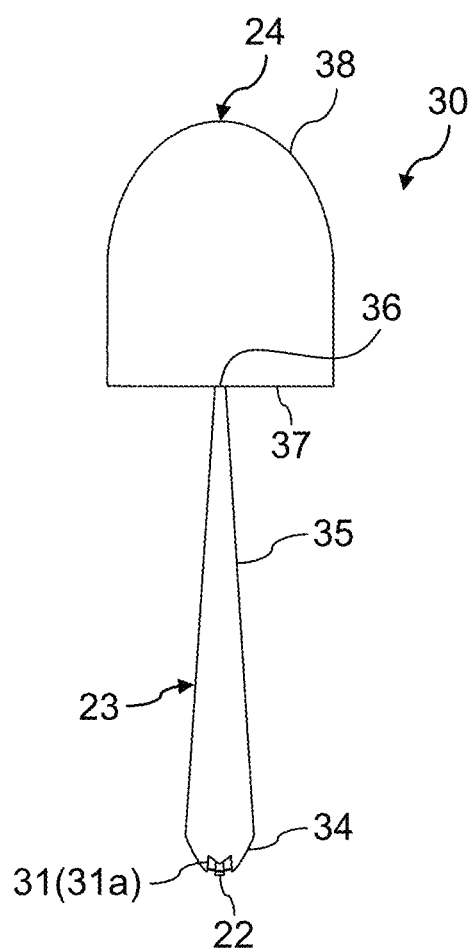
FIG. 5B is a view for explaining a cross section in a plane direction of the lens unit of the vehicle headlamp according to Embodiment 1.
Figure 5C:
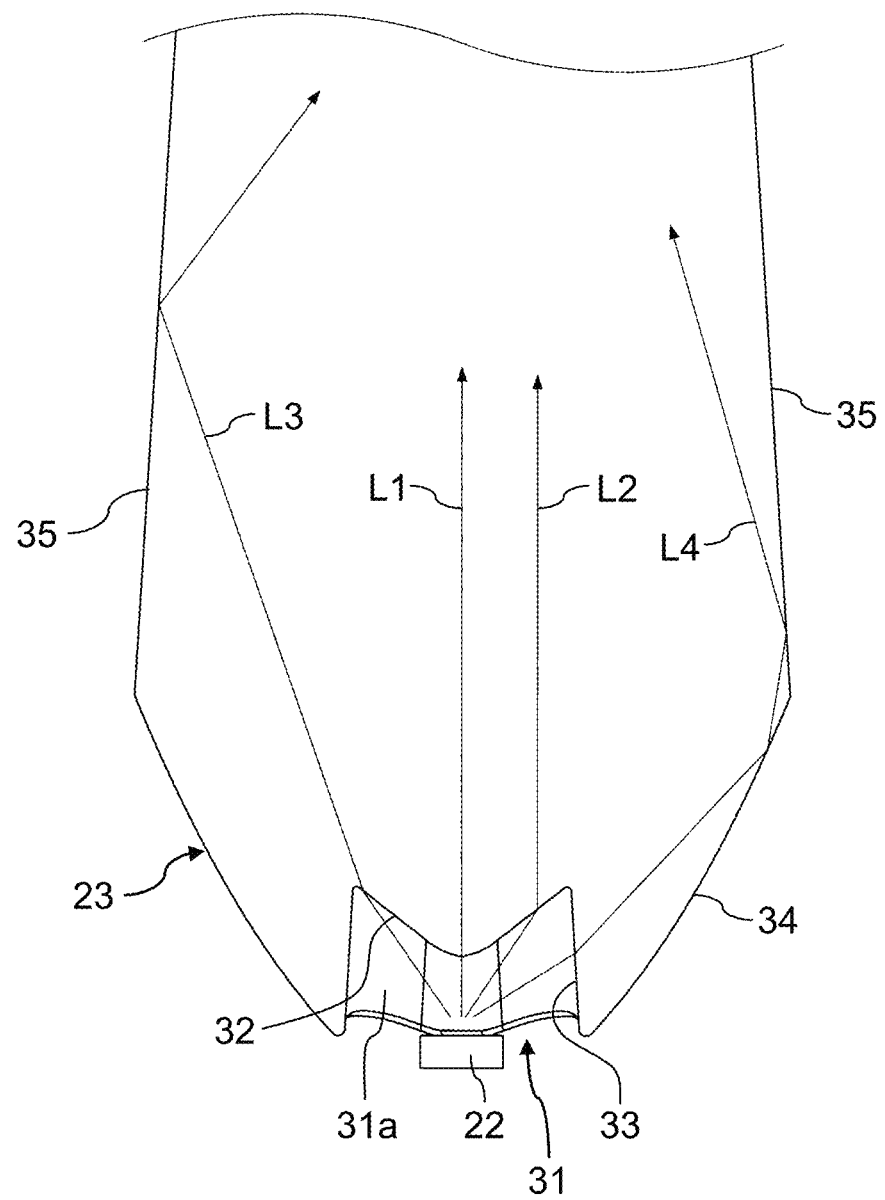
FIG. 5C is a view for explaining the cross section in the plane direction of a first lens of the vehicle headlamp according to Embodiment 1.

Next, a configuration of one lens unit 30 will be described with reference to FIGS. 5A, 5B, and 5C. FIG. 5A is a plan view of lens unit 30 of vehicle headlamp 2 according to Embodiment 1. FIG. 5B is a view for explaining a cross section in a plane direction of lens unit 30 of vehicle headlamp 2 according to Embodiment 1. FIG. 5C is a view for explaining the cross section in the plane direction of first lens 23 of vehicle headlamp 2 according to Embodiment 1.

As illustrated in FIGS. 5A and 5B, lens unit 30 includes first lens 23 and second lens 24. Second lens 24 is disposed in front of first lens 23. First lens 23 is elongated in a forward and backward direction. First lens exit 36 is provided at a front end of first lens 23 and first lens entrance 31 is provided at a back end thereof. In addition, recess portion 31*a* surrounding LED 22 is provided in first lens entrance 31.

As illustrated in FIG. 5C, first entrance surface 32 is provided on a bottom surface of recess portion 31*a* and second entrance surface 33 is provided on a side surface of recess portion 31*a*. First entrance surface 32 has a projection shape toward LED 22.

In addition, the side surface of first lens 23 has a two-stage configuration of first reflection surface 34 on a back side and second reflection surface 35 on a front side. First reflection surface 34 has a tapered shape of which a width decreases toward the back side and second reflection surface 35 has a tapered shape of which a width decreases toward the front side. A shape of first lens exit 36 of first lens 23 has a rectangular shape. In addition, first lens exit 36 has a flat shape. Moreover, first lens 23 is made of a transparent resin such as an acrylic resin or a polycarbonate resin as a material by a general resin molding method.

The light generated and diverged from LED 22 first enters first entrance surface 32 provided on the bottom surface of recess portion 31*a* or second entrance surface 33 provided on the side surface of recess portion 31*a*. For example, optical path L1 passing through a center of first entrance surface 32 directly goes straight and reaches first lens exit 36 of first lens 23. Optical path L2 passing through a position slightly shifted from the center of first entrance surface 32 is refracted toward the center by first entrance surface 32 having the projection shape, and then directly goes straight to reach first lens exit 36. Optical path L3 passing through a position slightly shifted from the center of first entrance surface 32 is refracted by first entrance surface 32 having the projection shape, and then totally reflected by second reflection surface 35 to reach first lens exit 36. Optical path L4 passing through second entrance surface 33 is refracted by second entrance surface 33, and then totally reflected by first reflection surface 34, and is further totally reflected by second reflection surface 35 to reach first lens exit 36.

As described above, the light generated from LED 22 converges to first lens exit 36 of first lens 23. That is, first lens 23 guides the light generated from LED 22 to second lens 24 using first lens exit 36 as a secondary light source.

Figure 6A:
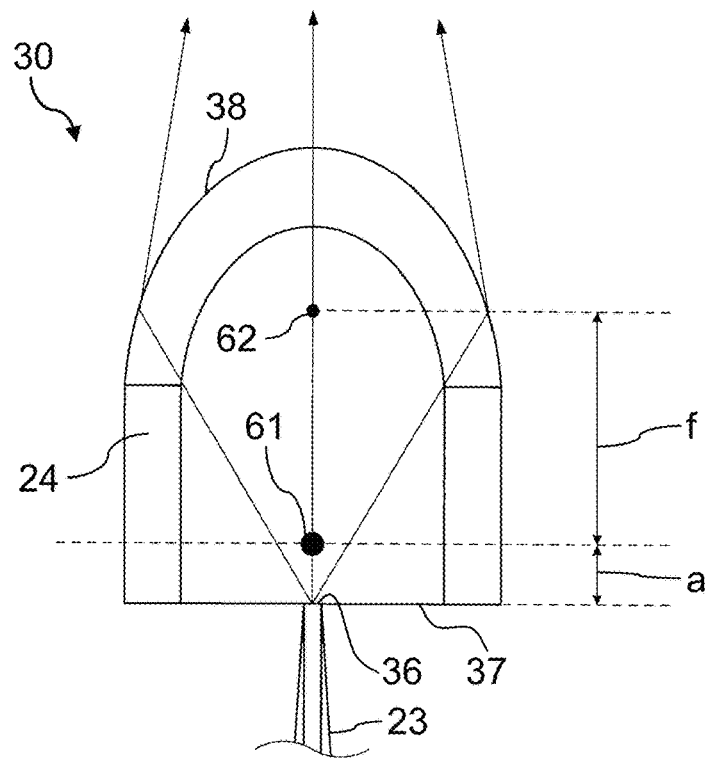
FIG. 6A is a schematic view illustrating a relationship between a focal point of a second lens of the high beam of the vehicle headlamp according to Embodiment 1 and light emitted from a second lens exit of the second lens.

FIG. 6A is a schematic view illustrating a relationship between focal point 61 of second lens 24 of high beam 3 of vehicle headlamp 2 according to Embodiment 1 and the light emitted from second lens exit 38 of second lens 24. As illustrated in FIG. 6A, second lens 24 includes second lens entrance 37 and second lens exit 38. Second lens entrance 37 of second lens 24 has a flat shape and faces first lens exit 36 of first lens 23 so as to be parallel thereto within a gap therebetween. Second lens exit 38 of second lens 24 has a projection shape toward the front side of the vehicle. Moreover, second lens 24 is also made of a transparent resin such as an acrylic resin or a polycarbonate resin as a material by a general resin molding method.

Here, in vehicle headlamp 2 according to the embodiment, as illustrated in FIG. 6A, focal point 61 of second lens 24 is positioned on an inside of second lens 24. That is, focal point 61 of second lens 24 is positioned on a front side (second lens 24 side) from first lens exit 36 of first lens 23.

Figure 6B:
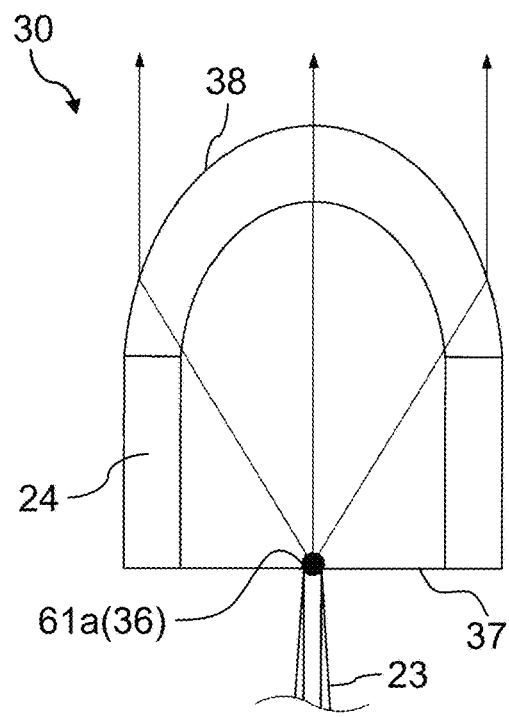
FIG. 6B is a schematic view illustrating a relationship between a focal point of a second lens of a high beam of a vehicle headlamp of the related art and light emitted from the second lens.

Here, FIG. 6B is a schematic view illustrating a relationship between focal point 61*a* of second lens 24 of high beam 3 of vehicle headlamp 2 of the related art and light emitted from second lens 24. In the vehicle headlamp of the related art, as illustrated in FIG. 6B, focal point 61*a* of second lens 24 is positioned in first lens exit 36 of first lens 23. In this case, the light entered second lens entrance 37 of second lens 24 using first lens exit 36 of first lens 23 as a secondary light source is substantially parallel light and emitted from second lens exit 38 of second lens 24. Therefore, light and dark between the irradiation range of the light and the non-irradiation range are clearly distinguished.

Figure 7:
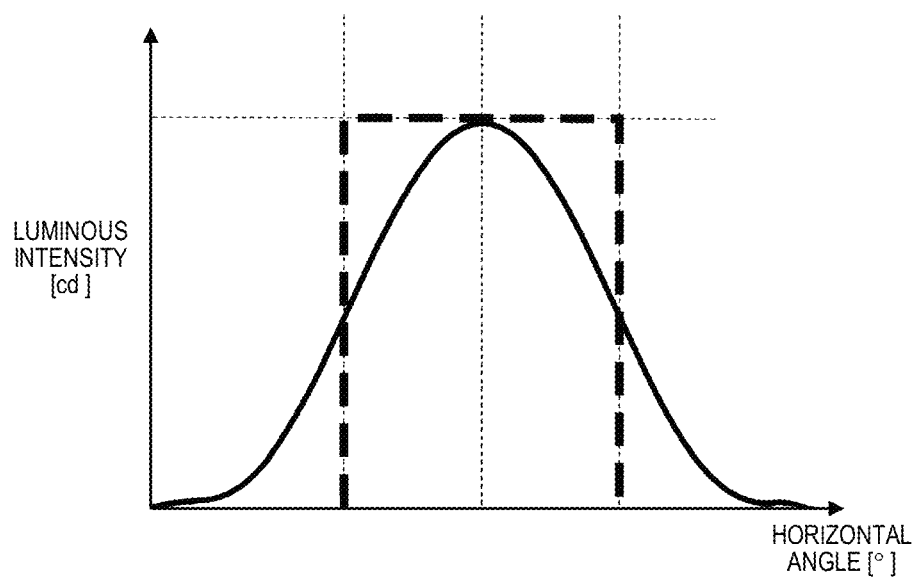
FIG. 7 is a graph illustrating light distribution characteristics of the lens unit, in which a solid line indicates a case of the lens unit of the vehicle headlamp according to Embodiment 1 and a broken line indicates a case of a lens unit of the vehicle headlamp of the related art.

FIG. 7 is a graph illustrating light distribution characteristics of the lens unit, in which a solid line indicates a case of lens unit 30 of vehicle headlamp 2 according to Embodiment 1 and a broken line indicates a case of a lens unit of the vehicle headlamp of the related art. As illustrated in FIG. 6B, the light distribution characteristics of the lens unit of the related art are distributed in a top hat type as illustrated in a broken line in FIG. 7. Moreover, a horizontal angle in FIG. 7 is configured such that the center of lens unit 30 is set to 0°.

On the other hand, in vehicle headlamp 2 according to the embodiment, as illustrated in FIG. 6A, focal point 61 of second lens 24 is positioned on second lens 24 side from first lens exit 36 of first lens 23, so that the light entered second lens entrance 37 of second lens 24 using first lens exit 36 of first lens 23 as the secondary light source is not the parallel light and is emitted from second lens exit 38 in a state of being inclined toward the center of lens unit 30.

Therefore, light and dark between the irradiation range of the light and the non-irradiation range are blurred. That is, the light distribution characteristics of lens unit 30 of high beam 3 of vehicle headlamp 2 according to the embodiment have a gentle distribution close to a Gaussian distribution in which the luminous intensity is a peak at the center (horizontal angle 0°) of lens unit 30 as illustrated in the solid line in FIG. 7.

Figure 8A:
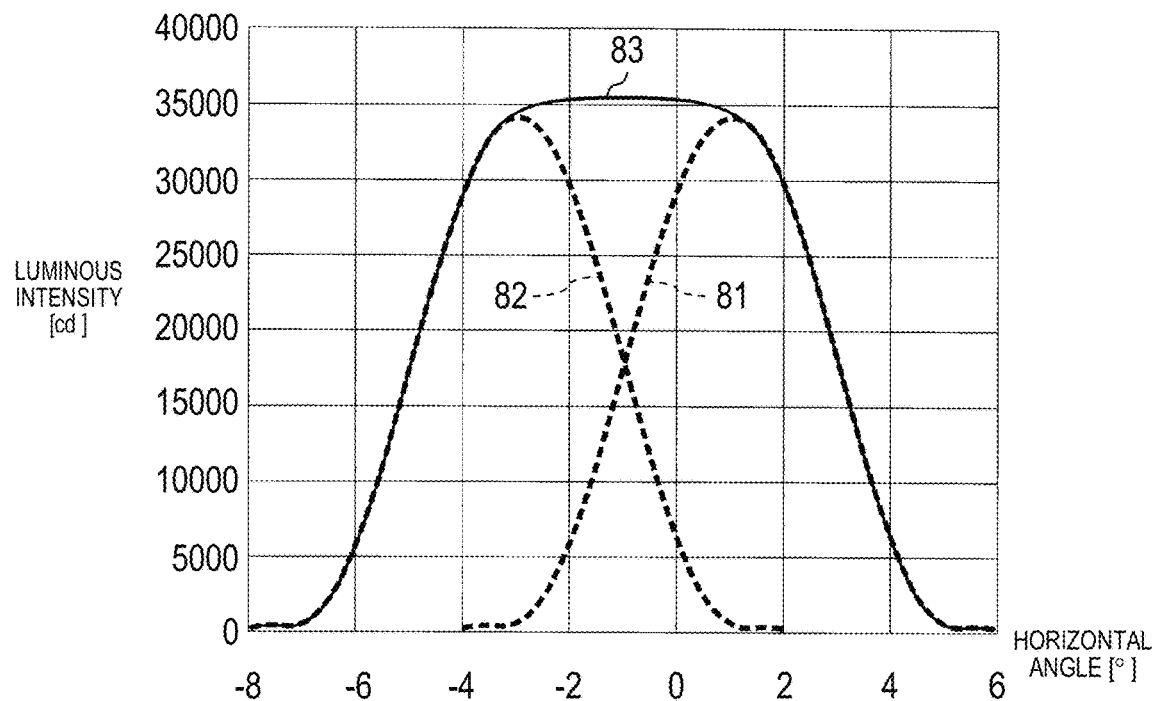
FIG. 8A is a graph illustrating light distribution characteristics of two lens units in a state where there is no positional deviation and combined light distribution characteristics thereof in the vehicle headlamp according to Embodiment 1.

FIG. 8A illustrates light distribution characteristics of two lens units 30c and 30e in high beam 3 of vehicle headlamp 2 according to Embodiment 1. Here, FIG. 8A is a graph illustrating the light distribution characteristics of two lens units 30 in a state where there is no positional deviation and combined light distribution characteristics thereof in vehicle headlamp 2 according to Embodiment 1. Reference numeral 81 indicates the light distribution characteristics of lens unit 30c, reference numeral 82 indicates the light distribution characteristics of lens unit 30e, and reference numeral 83 indicates the combined light distribution characteristics obtained by superposing the light distribution characteristics 81 of lens unit 30c and the light distribution characteristics 82 of lens unit 30e.

Figure 8B:
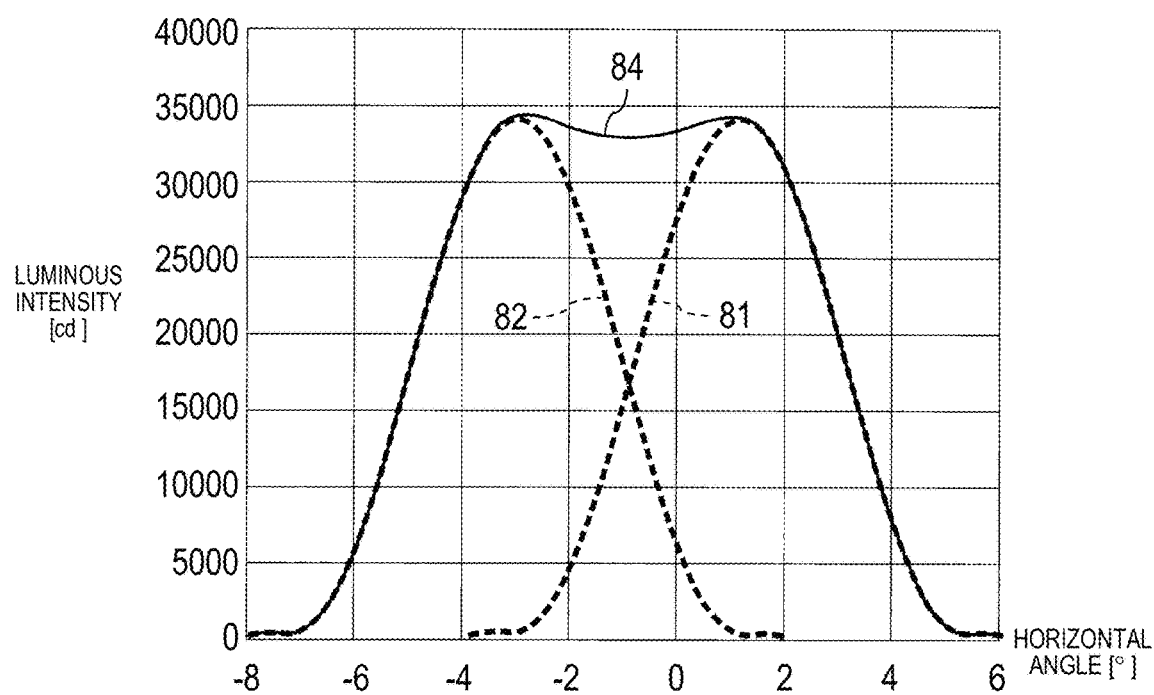
FIG. 8B is a graph illustrating the light distribution characteristics of two lens units in a state where there is the positional deviation and combined light distribution characteristics thereof in the vehicle headlamp according to Embodiment 1.

FIG. 8B is a graph illustrating the light distribution characteristics of two lens units 30c and 30e similar to the case of FIG. 8A, and illustrating the light distribution characteristics of two lens units in a state where there is the positional deviation and combined light distribution characteristics thereof in the vehicle headlamp according to Embodiment 1 which is different from FIG. 8A. Specifically, light distribution characteristics 81 of lens unit 30c are displaced by the horizontal angle of 0.2° with respect to light distribution characteristics 82 of lens unit 30e. Such a positional deviation of the light distribution characteristics is generated, for example, by vibration or a temperature change of lens unit 30, an assembly error of vehicle headlamp 2, or the like. Reference numeral 84 indicates the combined light distribution characteristics of two lens units 30c and 30e.

When comparing combined light distribution characteristics 83 (FIG. 8A) of a case where there is no positional deviation and combined light distribution characteristics 84 (FIG. 8B) of a case where there is the positional deviation, it can be seen that the luminous intensity decreases somewhat near the horizontal angle 0° due to generation of the positional deviation of light distribution characteristics 81, but there is no sudden change.

Figure 8C:
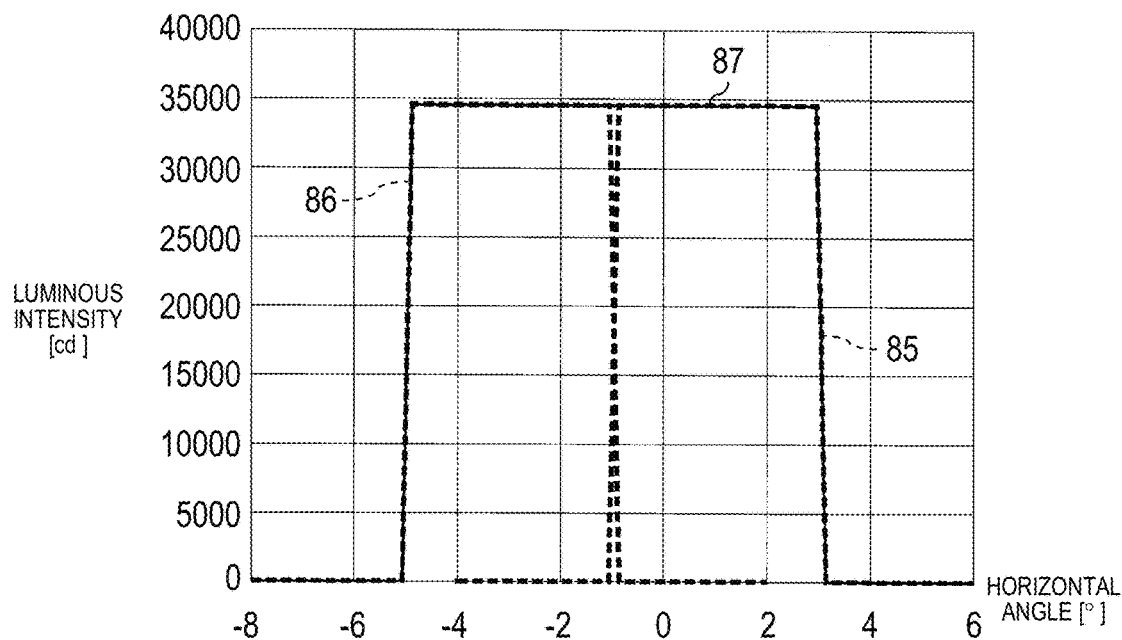
FIG. 8C is a graph illustrating light distribution characteristics of two lens units in a state where there is no positional deviation and combined light distribution characteristics thereof in the vehicle headlamp of the related art.

On the other hand, FIG. 8C is a graph illustrating the light distribution characteristics of two lens units similar to the case of FIG. 8A, not illustrating the vehicle headlamp according to the embodiment, but illustrating the light distribution characteristics of the vehicle headlamp of the related art. In addition, FIG. 8C is a graph illustrating the light distribution characteristics of two lens units in a state where there is no positional deviation and combined light distribution characteristics thereof in the vehicle headlamp of the related art. Reference numeral 85 indicates the light distribution characteristics of the lens unit of the related art provided at a position corresponding to the position of lens unit 30c and illustrated in FIG. 6B, reference numeral 86 indicates the light distribution characteristics of the lens unit of the related art provided at a position corresponding to the position of lens unit 30e and illustrated in FIG. 6B, and reference numeral 87 indicates the combined light distribution characteristics of the two lens units.

Figure 8D:
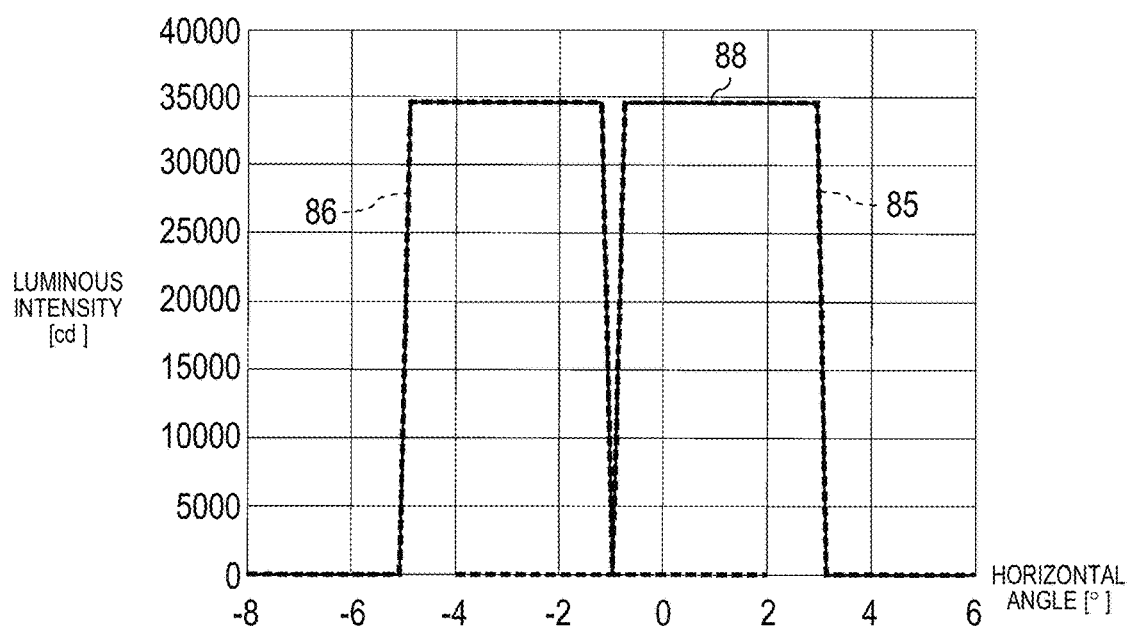
FIG. 8D is a graph illustrating light distribution characteristics of two lens units in a state where there is the positional deviation and combined light distribution characteristics in the vehicle headlamp of the related art.

FIG. 8D is a graph illustrating the light distribution characteristics of the vehicle headlamp of the related art similar to the case of FIG. 8C, and illustrating the light distribution characteristics of two lens units in a state where there is the positional deviation and combined light distribution characteristics thereof in the vehicle headlamp of the related art which is different from FIG. 8C. Specifically, light distribution characteristics 85 are displaced by the horizontal angle of 0.2° with respect to light distribution characteristics 86. Reference numeral 88 indicates the combined light distribution characteristics of the two lens units.

When comparing combined light distribution characteristics 87 (FIG. 8C) of a case where there is no positional deviation and combined light distribution characteristics 88 (FIG. 8D) of a case where there is the positional deviation, it can be seen that the luminous intensity suddenly decreases near the horizontal angle 0° due to the generation of the positional deviation of light distribution characteristics 85. That is, a dark line is formed at 0°, resulting in strong light distribution unevenness.

In a case where there is the positional deviation, when comparing combined light distribution characteristics 84 (FIG. 8B) according to the embodiment and combined light distribution characteristics 88 (FIG. 8D) of the related art, it can be seen that gentle combined light distribution characteristics are obtained by adopting the embodiment. Therefore, even if the positional deviation of the light distribution characteristics is generated due to vibration or the temperature change of lens unit 30, the assembly error of vehicle headlamp 2, or the like, the light distribution unevenness can be suppressed.

<Result of Optical Simulation>

Figure 9A:
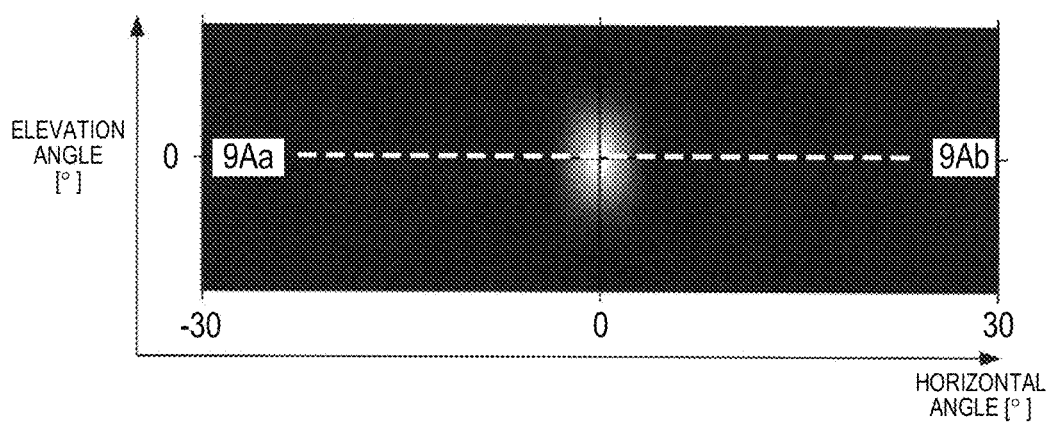
FIG. 9A is a graph illustrating a simulation result of the irradiation range of the light when an LED corresponding to a lens unit is lit by using one lens unit in the vehicle headlamp according to Embodiment 1.
Figure 9B:
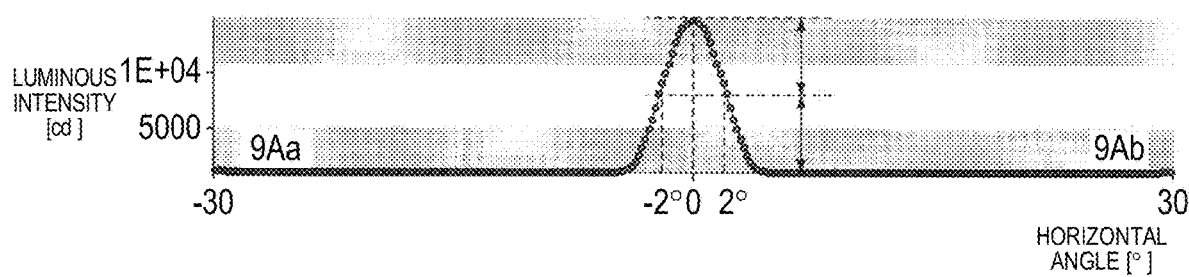
FIG. 9B is a graph illustrating a simulation result of the light distribution characteristics in a horizontal direction in a cross section 9Aa-9Ab of FIG. 9A.

Hereinafter, a result of an optical simulation of lens unit 30 according to Embodiment 1 will be described with reference to FIGS. 9A and 9B. FIG. 9A is a graph illustrating a simulation result of the irradiation range of the light when LED 22 corresponding to lens unit 30 is lit by using one lens unit 30 in vehicle headlamp 2 according to Embodiment 1. Here, a distance between focal point 61 and principal point 62 of second lens 24, that is, focal distance f (see FIG. 6A) is 42 mm and distance a (see FIG. 6A) between focal point 61 of second lens 24 and first lens exit 36 of first lens 23 is 5 mm. FIG. 9B is a graph illustrating a simulation result of the light distribution characteristics in the horizontal direction in a cross section 9Aa-9Ab of FIG. 9A. FIG. 9B illustrates a relationship between the horizontal angle (horizontal axis) and the luminous intensity (vertical axis) in the elevation angle 0°, that is, the light distribution characteristics of lens unit 30 in the horizontal direction. As illustrated in FIG. 9B, in a case where a half value width is ±2°, it can be seen that the light distribution characteristics gently change from the horizontal angle 0° which is the peak of the luminous intensity.

When focal distance f of second lens 24 is 42 mm, and optical distance a between focal point 61 of second lens 24 and first lens exit 36 of first lens 23 is 5 mm, a/f is approximately 0.12. Here, as a value of a/f decreases, a change rate of the light distribution characteristics increases, that is, it approaches the top hat type distribution of the related art. On the other hand, as the value of a/f increases, the change rate of the light distribution characteristics decreases, but if the value of a/f is too large, the light distribution characteristics expand in the horizontal direction unnecessarily. Therefore, it is preferable to design so that the value of a/f satisfies $0.05 < a/f < 0.2$.

<Other Examples of Embodiment 1>

The embodiment has an aspect in which focal point 61 of second lens 24 is positioned on the inside of second lens 24, but it is not limited to the aspect.

Figure 6C:
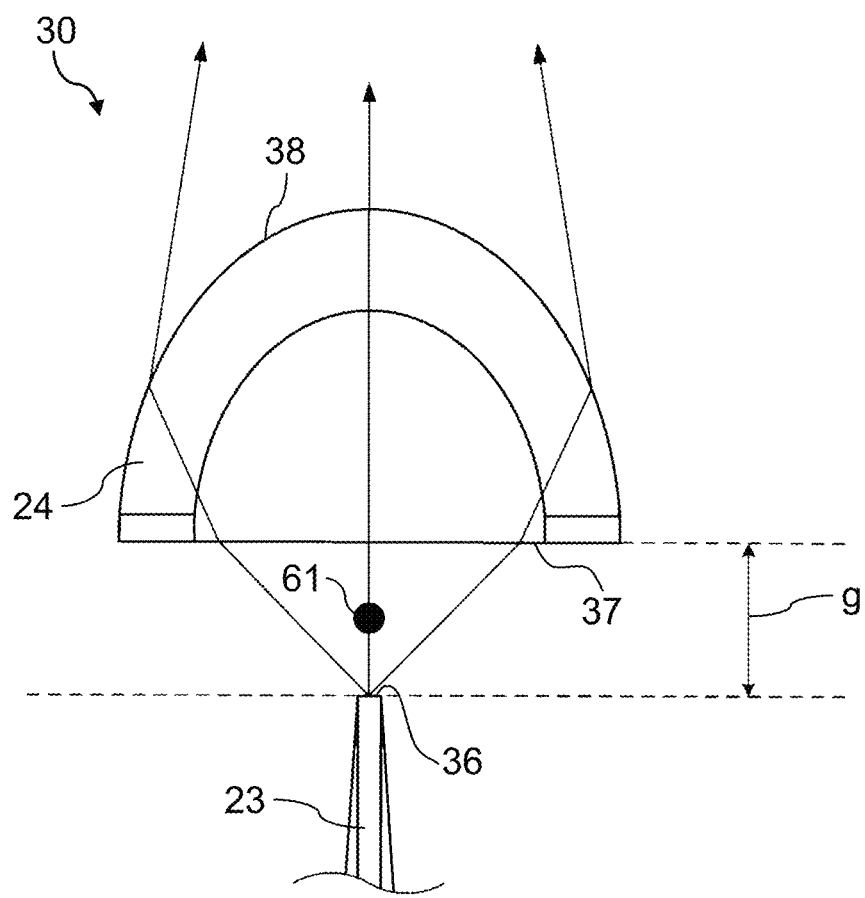
FIG. 6C is a schematic view illustrating a relationship between a focal point of a second lens of a high beam of a vehicle headlamp according to another example of Embodiment 1 and light emitted from a second lens exit of the second lens.

FIG. 6C is a schematic view illustrating a relationship between a focal point of second lens 24 of high beam 3 of a vehicle headlamp according to another example of Embodiment 1 and light emitted from second lens exit 38 of second lens 24. As illustrated in FIG. 6C, first lens exit 36 of first lens 23 and second lens entrance 37 of second lens 24 may be not in contact with each other, gap g may be provided between first lens exit 36 and second lens entrance 37, and focal point 61 of second lens 24 may be positioned in gap g. Gap g is a region sandwiched between first lens exit 36 of first lens 23 and second lens entrance 37 of second lens 24. In addition, gap g is not limited to the space. For example, gap g may be filled with a resin.

As described above, if focal point 61 of second lens 24 is positioned on the front side (second lens 24 side) from first lens exit 36 of first lens 23, the problem can be solved. A size of gap g, that is, a length in the forward and backward direction of the vehicle is, for example, substantially 10 mm to 50 mm.

(Embodiment 2)

Next, a vehicle headlamp according to Embodiment 2 will be described with reference to FIGS. 10A to 12B. Embodiment 1 has an aspect in which the light distribution unevenness between high beams 3 is suppressed, but Embodiment 2 has an aspect in which the light distribution unevenness between high beam 3 and low beam 4 is suppressed. The description of the same configuration as that of Embodiment 1 will be omitted and only different configurations will be described.

Figure 10A:
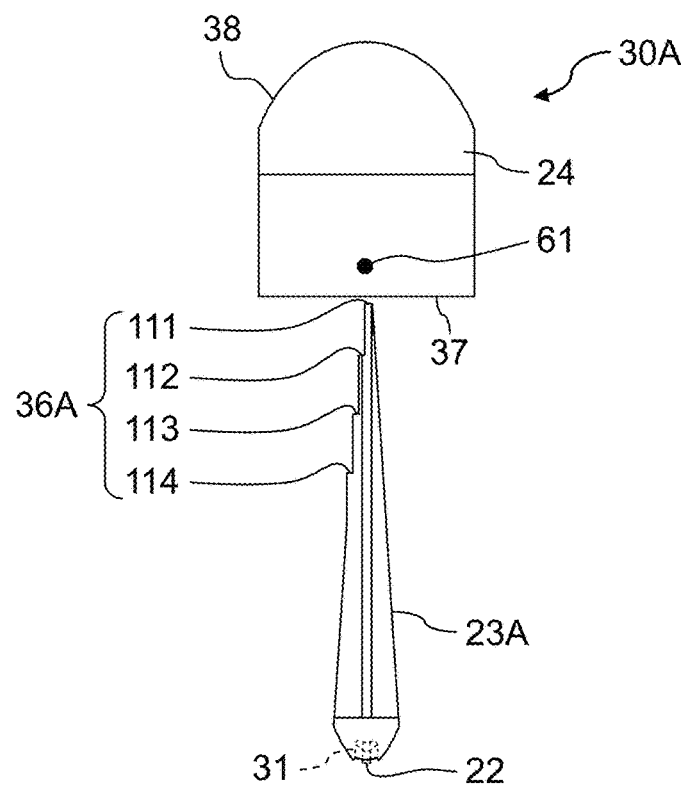
FIG. 10A is a right side view of a lens unit of a vehicle headlamp according to Embodiment 2.
Figure 10B:
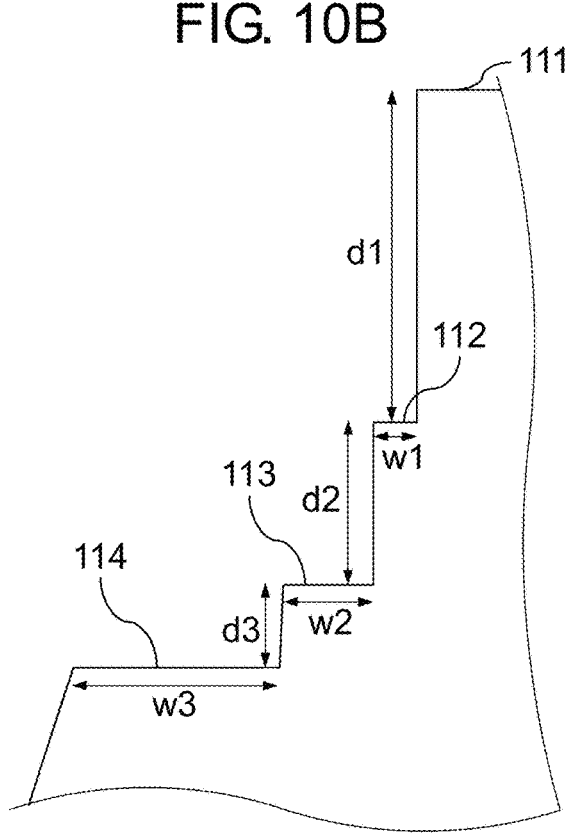
FIG. 10B is an enlarged plan view of a first lens exit of a first lens of the lens unit according to Embodiment 2.

FIG. 10A is a right side view of lens unit 30A of vehicle headlamp 2 according to Embodiment 2. A left side of the page indicates a lower side of vehicle 1 and a right side of the page indicates an upper side of vehicle 1. In lens unit 30A in the embodiment, first lens exit 36A of first lens 23A is configured of a plurality of exit surfaces having different distances from focal point 61 of second lens 24, that is, first exit surface 111, second exit surface 112, third exit surface 113, and fourth exit surface 114. FIG. 10B is an enlarged plan view of first lens exit 36A of first lens 23A of lens unit 30A according to Embodiment 2. In other words, FIG. 10B is an enlarged view of first lens exit 36A of first lens 23A of FIG. 10A.

When the plurality of exit surfaces configuring first lens exit 36A of first lens 23A move away from focal point 61 of second lens 24, the light beams emitted from the plurality of exit surfaces away from each other reach focal point 61 of second lens 24 while spreading. Therefore, while the light beams emitted from first exit surface 111, second exit surface 112, third exit surface 113, and fourth exit surface 114 of first lens 23A reach focal point 61 of the second lens, the luminous intensity distribution increases and the luminous intensity decreases. In addition, first exit surface 111, second exit surface 112, third exit surface 113, and fourth exit surface 114 are positioned below the center of second lens 24. Therefore, the luminous intensity on the lower side in the height direction decreases.

Figure 11A:
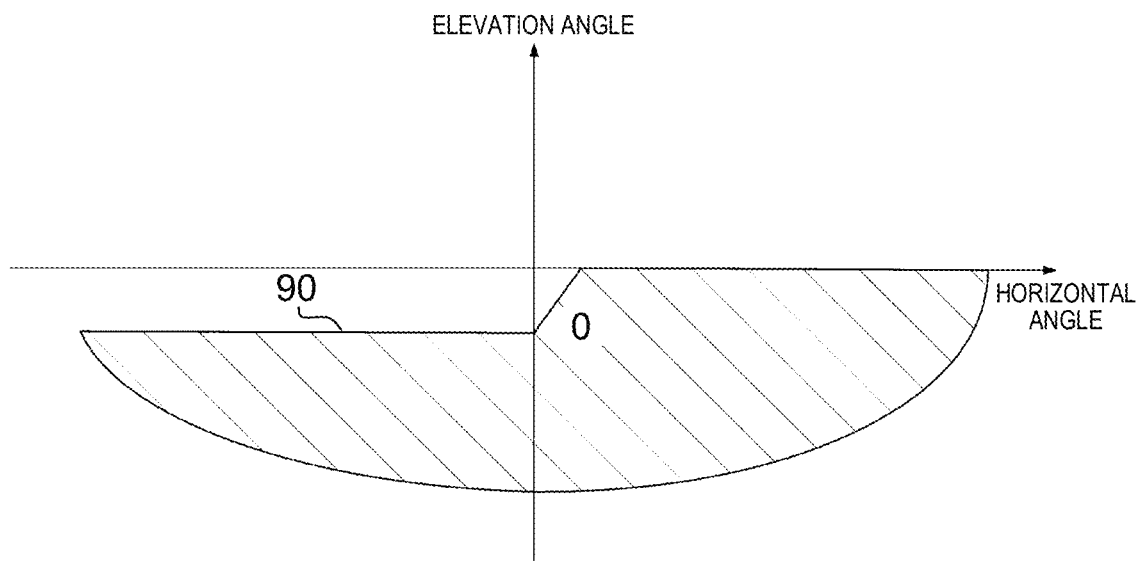
FIG. 11A is a schematic graph of an irradiation range of the light when general low beams are fully lit.

FIG. 11A is a schematic graph of an irradiation range of the light when general low beams are fully lit. Specifically, FIG. 11A is a graph illustrating a contour line of the luminous intensity, that is, an irradiation range of the light in a case where both right and left low beams of a general vehicle headlamp are lit at the same time. Moreover, in FIGS. 11A to 11E, the elevation angle is set in which the horizontal plane passing through vehicle headlamp 2 is 0° and the horizontal angle is set in which the center of the vehicle is 0°. The irradiation range of the low beam has cutoff line 90 with a large luminous intensity change near the elevation angle 0°.

Cutoff line 90 is a line separating light and dark of the light and is provided so as not to give dazzle to the driver of the oncoming vehicle. A shape of cutoff line 90 is not a straight line but a shape bent like an elbow near the horizontal angle 0°. Moreover, the irradiation range is assumed to be a case where the vehicle is on the right side and in a case of a left side passage, the irradiation range has a shape opposite to the right and left.

Figure 11B:
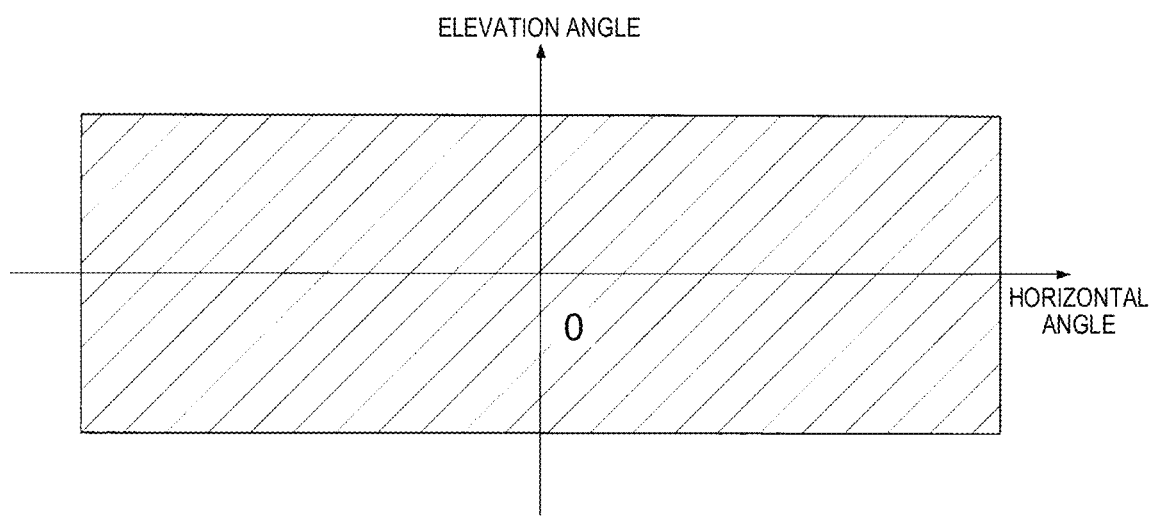
FIG. 11B is a schematic graph of an irradiation range of the light when high beams of the related art are fully lit.
Figure 11C:
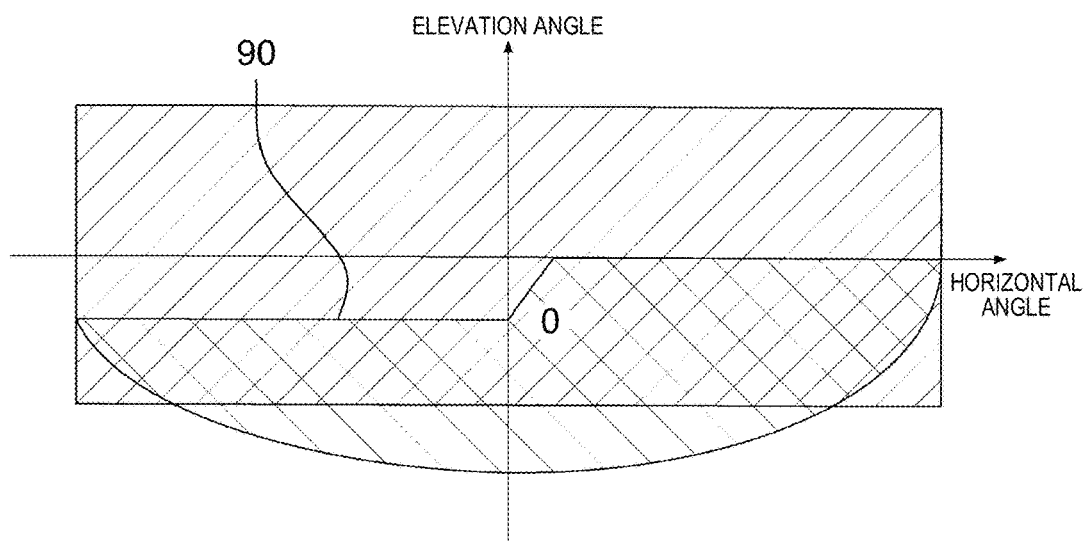
FIG. 11C is a schematic graph of an irradiation range of the light when general low beams and the high beams of the related art are fully lit.

FIG. 11B is a graph illustrating the irradiation range in a case where both right and left high beams of the vehicle headlamp of the related art are fully lit at the same time. FIG. 11C is a graph illustrating the irradiation range of the light in a case where both right and left high beams of the vehicle headlamp of the related art, and both right and left low beams of the general vehicle headlamp are fully lit at the same time. That is, FIG. 11C is a graph in which the irradiation range of the light in FIG. 11A and the irradiation range of the light in FIG. 11B are superimposed. In this case, it can be seen that the light distribution unevenness occurs due to cutoff line 90 of the low beam and the irradiation range of the high beam overlapping each other to strengthen the luminous intensity.

Figure 11D:
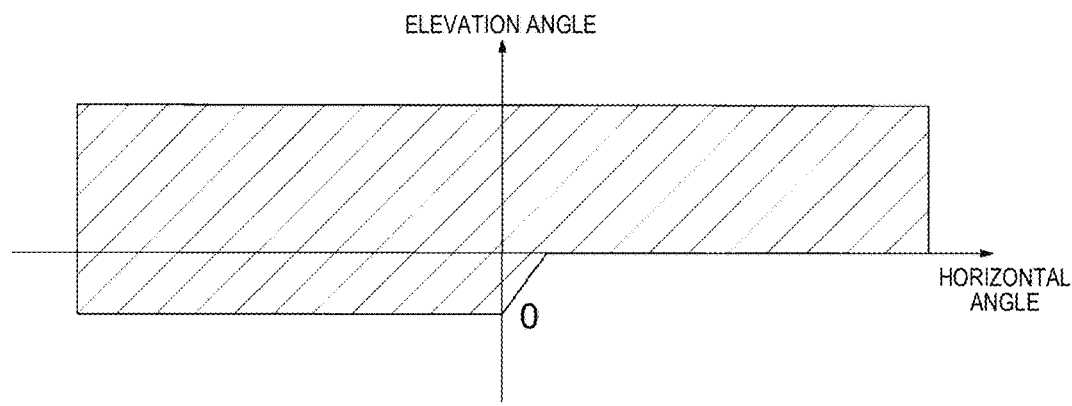
FIG. 11D is a schematic graph of an irradiation range of the light when high beams of the vehicle headlamp according to Embodiment 2 are fully lit.

FIG. 11D is a graph illustrating the irradiation range of the light in a case where both right and left high beams 3 of vehicle headlamp 2 according to Embodiment 2 are lit at the same time. Compared to the irradiation range of the light of the general high beam illustrated in FIG. 11B, it can be seen that the irradiation range of the light is interrupted on a lower side in the height direction.

Figure 11E:
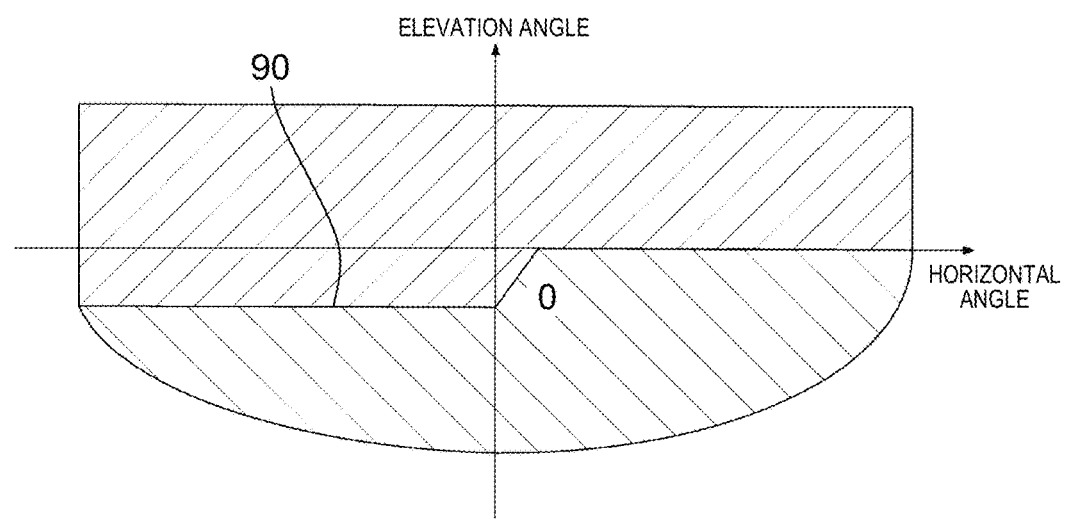
FIG. 11E is a schematic graph of an irradiation range of the light when general low beams and the high beams of the vehicle headlamp according to Embodiment 2 are fully lit.

FIG. 11E is a graph illustrating the irradiation range of the light in a case where both right and left low beams of the general vehicle headlamp and the both right and left high beams of the vehicle headlamp according to Embodiment 2 are lit at the same time. That is, FIG. 11E is a graph in which the irradiation range of the light of the low beam in FIG. 11A and the irradiation range of the light of the high beam in FIG. 11D are superimposed.

According to the vehicle headlamp of the embodiment, the luminous intensity of the high beam decreases in a range in which the irradiation range of the light of the high beam and the irradiation range of the light of the low beam are overlapping with each other, so that the light distribution unevenness can be reduced. This is because, as illustrated in FIGS. 10A and 10B, first lens exit 36A of first lens 23A in lens units 30A of left high beam 3 is configured of first exit surface 111, second exit surface 112, third exit surface 113, and fourth exit surface 114 having different distances from focal point 61 of second lens 24, first exit surface 111, second exit surface 112, third exit surface 113, and fourth exit surface 114 are positioned below the center of lens unit 30A, so that in the irradiation range of the light of high beam 3, the luminous intensity on the lower side in the height direction is low and the irradiation range of the light in the height direction is interrupted.

Furthermore, in left high beam 3 and right high beam 3, sizes of the irradiation ranges of the light beams in the height direction are different. That is, the irradiation range of left high beam 3 protrudes below the elevation angle 0°, but the irradiation range of right high beam 3 is interrupted near the elevation angle 0° as illustrated in FIG. 11D. This is to match the irradiation range of high beam 3 with the irradiation range of low beam 4 having cutoff line 90 as illustrated in FIG. 11E.

As described above, in order to control the size of the irradiation range of the light in the height direction, a ratio of the width of first exit surface 111 in first exit surface 111, second exit surface 112, third exit surface 113, and fourth exit surface 114 may be changed. That is, the width of first exit surface 111 increases, so that the irradiation range of the light in the height direction can be increased. Conversely, the width of first exit surface 111 decreases, so that the irradiation range of the light in the height direction can be decreased. In the embodiment, the width of first exit surface 111 of lens unit 30A in left high beam 3 is larger than the width of first exit surface 111 of lens unit 30A in right high beam 3. Therefore, the irradiation range of left high beam 3 is larger than the irradiation range of right high beam 3 in the height direction. Moreover, the "width" means a dimension in the height direction of the vehicle.

In addition, as illustrated in FIG. 11E, cutoff line 90 of low beam 4 is bent near the horizontal angle 0°. Therefore, in order to match the irradiation range of high beam 3 with cutoff line 90 of low beam 4, in the region near the horizontal angle 0° in the irradiation range of high beam 3, it is necessary not only to simply change the width of first exit surface 111 but also to make first exit surface 111 a bent shape matching cutoff line 90.

Moreover, in FIGS. 11D and 11E, the irradiation range of the light of left high beam 3 is larger than that of right high beam 3 in the height direction. This is assuming that the vehicle is on the right side and is caused that cutoff line 90 of low beam 4 is positioned on the left side. In a case where the vehicle on the left side, since cutoff line 90 of low beam 4 is positioned on the right side, the irradiation range of the light of right high beam 3 is larger than that of left high beam 3 in the height direction. Therefore, the irradiation range of the light of high beam 3 can be matched with cutoff line 90 of low beam 4.

<Result of Optical Simulation>

Figure 12A:
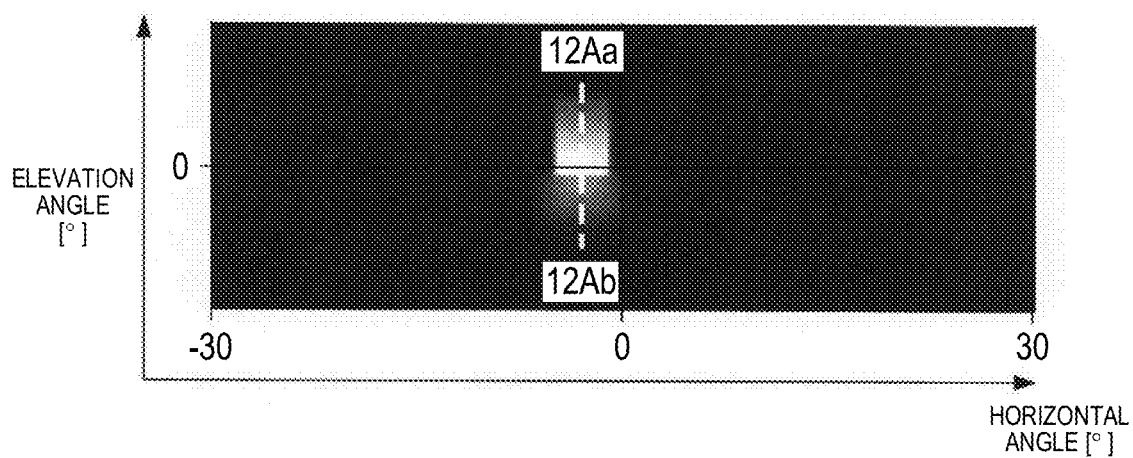
FIG. 12A is a graph illustrating a simulation result of an irradiation range of the light when an LED corresponding to a lens unit is lit by using one lens unit in the vehicle headlamp according to Embodiment 2.

Hereinafter, a result of an optical simulation of the vehicle headlamp according to the embodiment will be described with reference to FIGS. 12A and 12B. A material of first lens 23 and second lens 24 is polymethyl methacrylate resin (PMMA, refractive index is 1.49), and the focal distance of second lens 24 is 42 mm In addition, width w1 (see FIG. 10B) of second exit surface 112 is 0.2 mm, width w2 of third exit surface 113 is 0 4 mm, width w3 of fourth exit surface 114 is 3.2 mm, distance d1 between first exit surface 111 and second exit surface 112 in the forward and backward direction is 3.2 mm, distance d2 between the second exit surface and third exit surface 113 in the forward and backward direction is 1.6 mm, and distance d3 between third exit surface 113 and fourth exit surface 114 in the forward and backward direction is 0.8 mm FIG. 12A is a graph illustrating a simulation result of an irradiation range of the light when LED 22 corresponding to lens unit 30A is lit by using one lens unit 30A in vehicle headlamp 2 according to Embodiment 2. Specifically, FIG. 12A is a graph illustrating the light distribution characteristics of lens unit 30A disposed to be inclined at the horizontal angle 3.5° in left vehicle headlamp 2. It can be seen that the luminous intensity of a portion overlapping cutoff line 90 of low beam 4 decreases and it becomes dark.

Figure 12B:
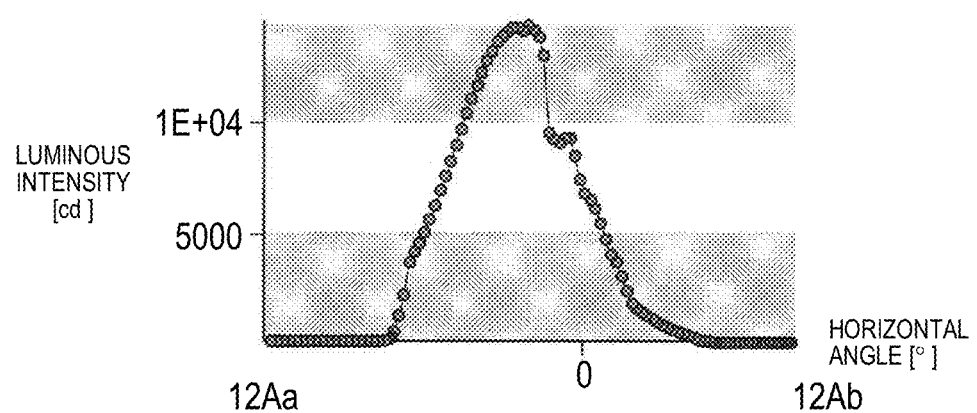
FIG. 12B is a graph illustrating a simulation result of light distribution characteristics in a height direction in a cross section of 12Aa-12Ab of FIG. 12A.
Figure 13:
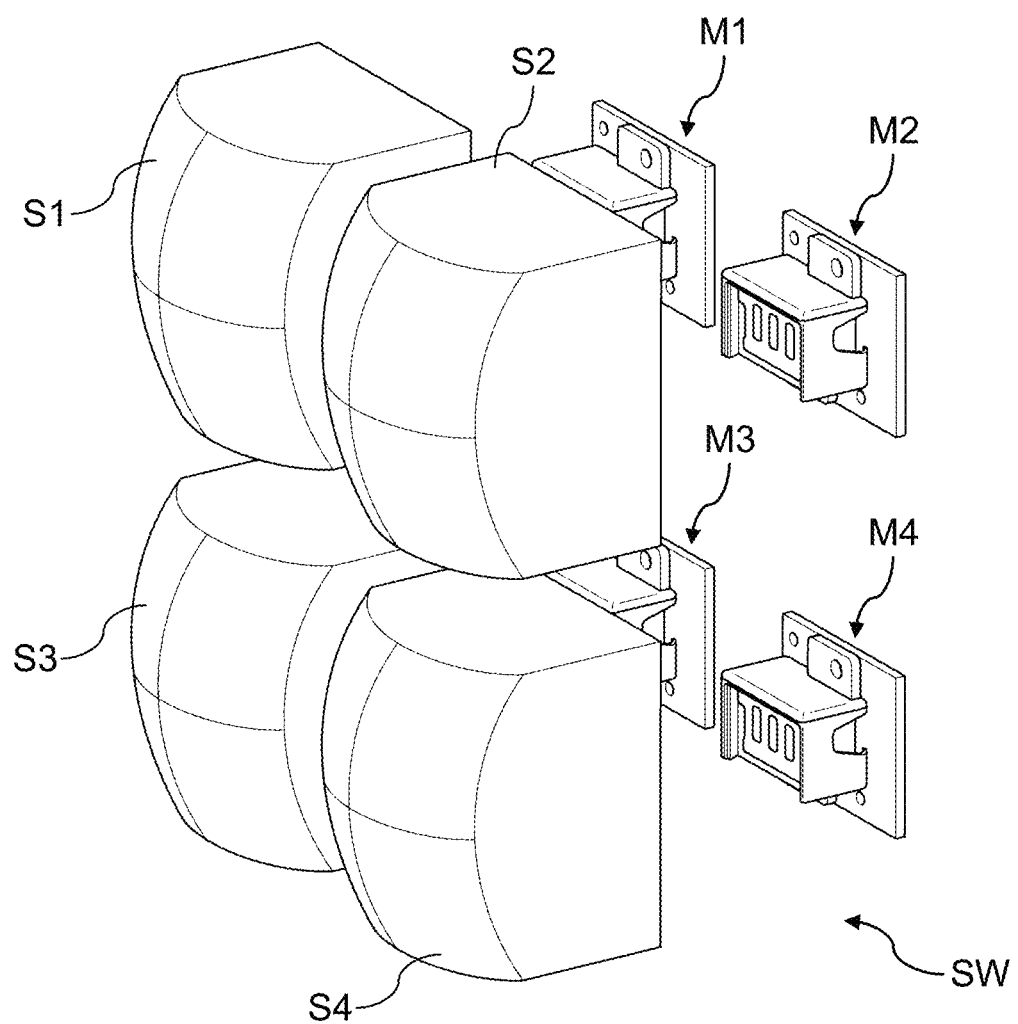
FIG. 13 is a perspective view of the high beam of the vehicle headlamp of the related art.

FIG. 12B is a graph illustrating a simulation result of light distribution characteristics in a height direction in a cross section of 12Aa-12Ab of FIG. 12A. Specifically, FIG. 12B illustrates a relationship between the elevation angle (horizontal axis) and the luminous intensity (vertical axis) in the horizontal angle 3.5°, that is, the light distribution characteristics of lens unit 30A in the height direction. As illustrated in FIG. 12B, it can be seen that the light distribution characteristics of lens unit 30A gradually change as the elevation angle decreases, that is, goes toward low beam 4, and changes so that the luminous intensity decreases greatly.

The plurality of exit surfaces configuring first lens exit 36A are formed such that the larger the distance from focal point 61 is, the larger the width is, and a distance between adjacent exit surfaces decreases, that is, d1≥d2≥d3, and w1≤w2≤w3. Therefore, the light distribution characteristics of lens unit 30A can be gently changed. Hereinafter, description will be given in detail.

In order to enlarge the irradiation range of the light, the distance from focal point 61 may be increased (values of d1 to d3 are increased). On the other hand, the luminous intensity of the light emitted from the plurality of exit surfaces configuring first lens exit 36A decreases as the exit surfaces move away from the center of lens unit 30A. That is, the luminous intensity is relatively large in second exit surface 112 and is relatively small in fourth exit surface 114. Therefore, for example, if the value of d3 is increased, the luminous intensity of the light emitted from fourth exit surface 114 is extremely lowered and the light distribution characteristics suddenly change. Therefore, it is preferable that the condition of d1≥d2≥d3 is satisfied.

In addition, as described above, the luminous intensity of the light emitted from second exit surface 112 is large. Therefore, if width w1 is increased, the light distribution characteristics suddenly change. That is, w1≤w2≤w3, that is, a width of a region in which the luminous intensity is relatively large is decreased and a width of a region in which the luminous intensity is relatively small is decreased, so that the light distribution characteristics can be gently changed as a whole. Therefore, it is preferable to design so that the condition described above is satisfied.

Moreover, the embodiment has an aspect in which first lens exit 36A of first lens 23A is configured of first exit surface 111, second exit surface 112, third exit surface 113, and fourth exit surface 114 which are four exit surfaces, but it is not limited to the aspect in which the number of exit surfaces configuring the first lens exit is four, and an aspect, in which the first lens exit is configured of a plurality of, that is, two or more exit surfaces may be provided.

(Other Embodiments)

Moreover, Embodiment 1 has an aspect in which the shape of first lens exit 36 of first lens 23 is rectangular, but the shape may be formed by cutting missing from an elliptical shape, a semicircular shape, or a semi-elliptical shape, and it is possible to form a free luminous intensity distribution by a combination thereof. In addition, Embodiments 1 and 2 can be combined.

In addition, although the vehicle headlamps of Embodiments 1 and 2 are provided with LEDs 22, naturally an aspect in which a light emitting element other than the LED is provided may be adopted.

INDUSTRIAL APPLICABILITY

The vehicle headlamp according to the disclosure can be used not only for the vehicle but also for a lighting device of a vehicle widely. In addition, it can also use as a lighting device for buildings.

REFERENCE MARKS IN THE DRAWINGS

1 VEHICLE
2 VEHICLE HEADLAMP

3 HIGH BEAM
4 LOW BEAM
30, 30a~30g, 30A LENS UNIT
21 BOARD
22, 22a~22g LED (LIGHT EMITTING ELEMENT)
23, 23A FIRST LENS
24 SECOND LENS
25 LED BOARD
31 FIRST LENS ENTRANCE
32 FIRST ENTRANCE SURFACE
33 SECOND ENTRANCE SURFACE
34 FIRST REFLECTION SURFACE
35 SECOND REFLECTION SURFACE
36, 36A FIRST LENS EXIT
37 SECOND LENS ENTRANCE
38 SECOND LENS EXIT
61, 61a FOCAL POINT
111 FIRST EXIT SURFACE
112 SECOND EXIT SURFACE
113 THIRD EXIT SURFACE
114 FOURTH EXIT SURFACE

The invention claimed is:

1. A vehicle headlamp comprising:
a plurality of light emitting elements;
a plurality of first lenses corresponding to the plurality of light emitting elements, respectively, each including a first lens entrance and a first lens exit, and each configured to converge light entering the first lens entrance from the respective corresponding light emitting onto the first lens exit; and
a plurality of second lenses corresponding the plurality of first lenses, respectively, each including a second lens entrance facing the first lens exit of the respective corresponding first lens, and a second lens exit having a projection shape for forming a focal point,
wherein the focal point of each second lens is positioned inside the second lens, between the second lens entrance and the second lens exit, and between the second lens entrance and the principal point of the second lens.

2. The vehicle headlamp of claim 1,
wherein a recess portion is provided in the first lens entrance of each of the plurality of first lenses,
wherein the first lens entrance of each of the plurality of first lenses includes
a first entrance surface which is provided on a bottom surface of the recess portion and has a projection shape toward each of the light emitting elements, and
a second entrance surface which is provided on a side surface of the recess portion, and
wherein each of the plurality of first lenses includes
a first reflection surface which is configured to totally reflect light entering the second entrance surface and guides the light to the first lens exit, and
a second reflection surface which is configured to totally reflect light passing through the first entrance surface and the light reflected by the first reflection surface, and guide the both lights to the first lens exit.

3. The vehicle headlamp of claim 1,
wherein when a focal distance of each of the second lenses is f, and an optical distance from a position of the focal point of each of the second lenses to the first lens exit of each of the first lenses is a, $0.05 \leq a/f \leq 0.2$ is satisfied.

4. The vehicle headlamp of claim 1,
wherein the first lens exit of the each of plurality of first lenses includes a plurality of exit surfaces having different distances from the focal point of the second lens, and
wherein the distances of the plurality of exit surfaces from the focal point are larger toward a lower side in a height direction in a state of being placed in a vehicle.

5. The vehicle headlamp of claim 4,
wherein in the plurality of exit surfaces, a dimension in the height direction is larger in a state of being placed in a vehicle and a distance between adjacent exit surfaces is smaller as the distance from the focal point is larger.

6. A vehicle comprising:
the headlamp of claim 1.

7. A vehicle headlamp comprising:
a plurality of light emitting elements;
a plurality of first lenses each of which is provided corresponding to each of the plurality of light emitting elements, includes a first lens entrance and a first lens exit, and is configured to converge lights entered the first lens entrance from the each of the plurality of light emitting elements on the first lens exit; and
a plurality of second lenses each of which is provided corresponding to each of the plurality of light emitting elements, and includes a second lens entrance facing the first lens exit and a second lens exit having a projection shape for forming a focal point,
wherein the focal point of the second lens is positioned at a side of the second lens ahead the first lens exit of the first lens,
wherein the first lens exit of the each of plurality of first lenses includes a plurality of exit surfaces having different distances from the focal point of the second lens, and
wherein the distances of the plurality of exit surfaces from the focal point are larger toward a lower side in a height direction in a state of being placed in a vehicle.

8. The vehicle headlamp of claim 7,
wherein in the plurality of exit surfaces, a dimension in the height direction is larger in a state of being placed in a vehicle and a distance between adjacent exit surfaces is smaller as the distance from the focal point is larger.

* * * * *